United States Patent

Holden

(10) Patent No.: US 6,343,452 B1
(45) Date of Patent: *Feb. 5, 2002

(54) TUBULAR FRAME

(76) Inventor: Laurence Holden, 114 Hart Lane, Luton, Bedfordshire LU2 0JG (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/137,451
(22) PCT Filed: Feb. 17, 1997
(86) PCT No.: PCT/GB97/00434
    § 371 Date: Aug. 14, 1998
    § 102(e) Date: Aug. 14, 1998
(87) PCT Pub. No.: WO97/30236
    PCT Pub. Date: Aug. 21, 1997

(30) Foreign Application Priority Data

Feb. 19, 1996 (GB) .............................................. 9603476

(51) Int. Cl.[7] .................................................. E04C 2/08
(52) U.S. Cl. .............................. 52/660; 52/664; 52/670; 52/653.2; 52/671
(58) Field of Search ................................ 52/660, 664, 670, 52/653.2, 671

(56) References Cited

U.S. PATENT DOCUMENTS

| | | | | |
|---|---|---|---|---|
| 312,864 A | * | 2/1885 | Kinney | 52/670 |
| 1,372,741 A | * | 3/1921 | Dickinson | 52/671 |
| 1,619,518 A | * | 3/1927 | Junkers | 52/660 |
| 1,982,110 A | * | 11/1934 | Keown | 52/660 |
| 2,073,758 A | * | 3/1937 | Schmeller, Sr. | 52/670 |
| 2,133,258 A | * | 10/1938 | Vass | 52/670 |
| 2,978,077 A | * | 4/1961 | Wood | 52/660 |
| 3,017,971 A | * | 1/1962 | Christman | 52/660 |
| 3,045,325 A | * | 7/1962 | Mabie | 52/660 |
| 3,070,198 A | * | 12/1962 | Haskell | 52/670 |
| 4,603,519 A | * | 8/1986 | Lew et al. | 52/664 X |

FOREIGN PATENT DOCUMENTS

DE        173257    * 11/1904 .................. 52/660

* cited by examiner

Primary Examiner—Carl D. Friedman
Assistant Examiner—Phi Dieu Tran A
(74) Attorney, Agent, or Firm—William D. Hall

(57) ABSTRACT

A tubular main frame (2) for an aeroplane, bridge, or pressure vessel, for example, comprises a honeycomb structure with cells (4) thereof distributed round the periphery of the frame and along the frame, the cells each being at least pentagonal, preferably largely hexagonal.

22 Claims, 5 Drawing Sheets

Figure 2:
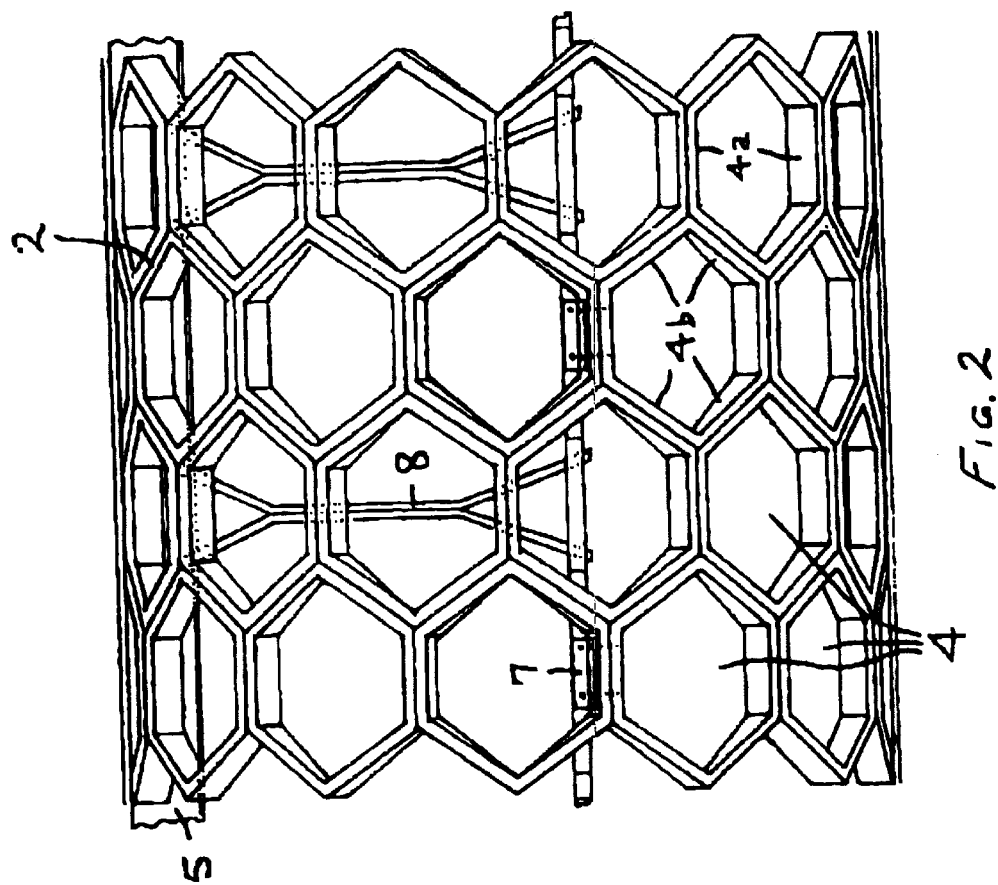

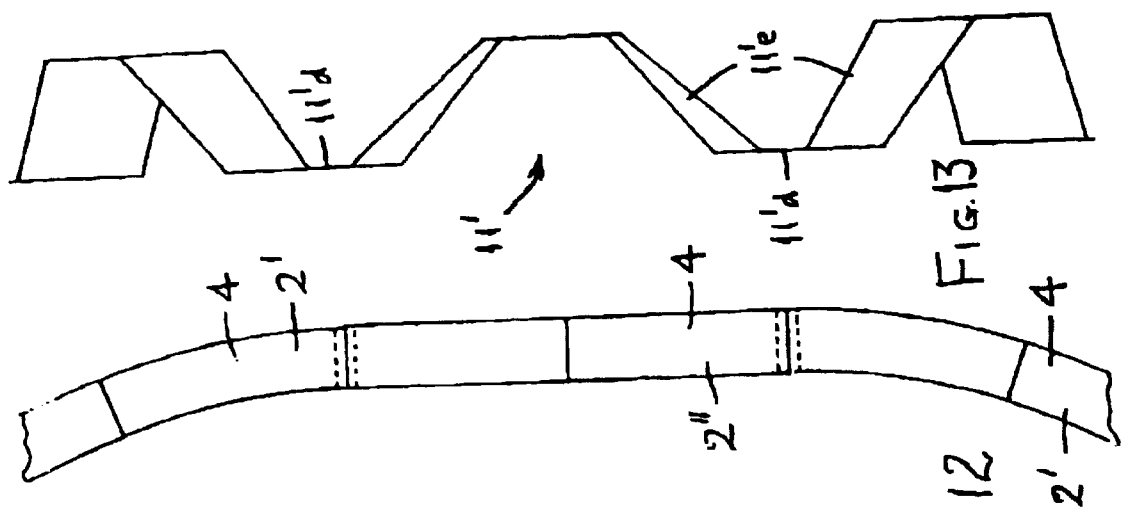
Fig. 13
Fig. 12
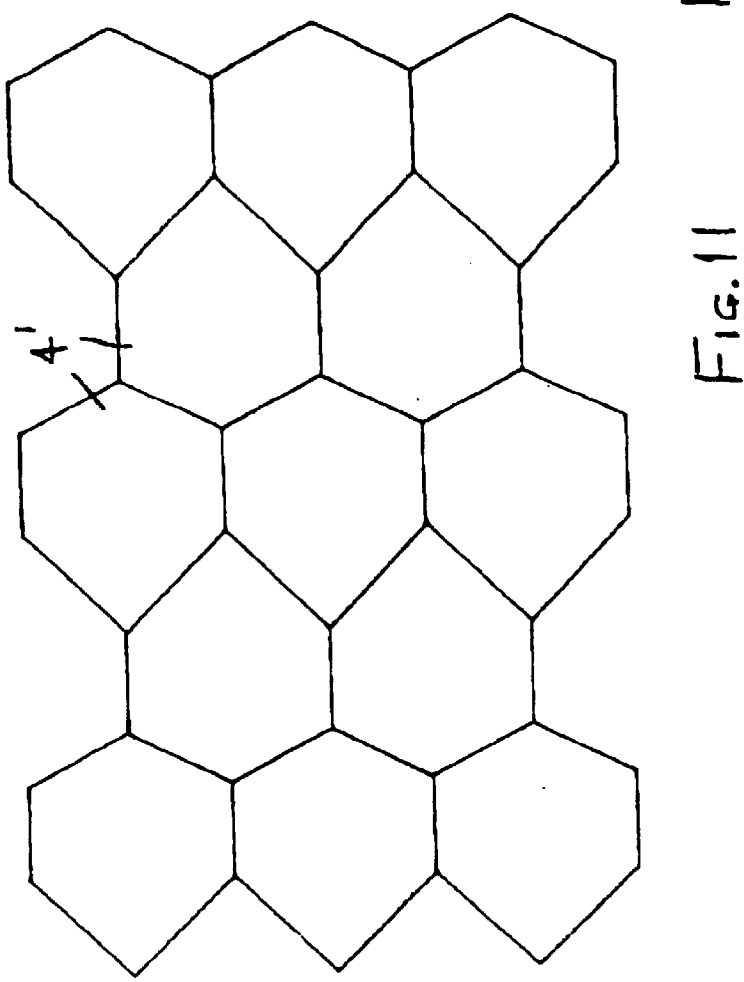
Fig. 11

TUBULAR FRAME

This invention relates to a tubular frame.

The honeycomb is well known in the natural environment and its advantage in strength:weight ratio is well documented.

The strength:weight ratio factor is an ongoing problem in the aeroplane and aerospace industries. The greatest percentage of commercial aeroplane structural weight is that of the main airframe structure and skin structure combined so it is in that area that an improvement is sought. The type of commercial aeroplane fuselage structures in use at present is mainly frame and stringer covered by a skin. Another fundamental problem in an aeroplane structure is that of metal fatigue caused mainly by compound fluctuations leading to weakening, cracking, or even total failure.

U.S. Pat. No. 4674712 discloses a composite material aeroplane having a double-lobe fuselage cross-section. The fuselage comprises a double-lobe shell, an interior vertical plane centreline web, and an interior platform supported centrally by the web, all formed of composite panels comprised of graphite honeycomb cores with biasplied layers of graphite fibre skins.

CH-A-571130 discloses a skeleton suitable for the construction of factory and warehouse buildings, which can be assembled from individual, lightweight, compact, structural components. The skeleton can be in the form of part of a sphere or part of a cylinder. The components are in the form of polygonal frames which are assembled together to provide a honeycomb-form skeleton. A major advantage is stated to be that the individual components are relatively inexpensive to manufacture and can conveniently be transported to the construction site where they can readily be connected together.

According to the present invention, there is provided a tubular frame, characterized in that said frame comprises a honeycomb structure with cells thereof distributed round the periphery of the frame and distributed along the frame, and in that said cells are each of at least five-sided form and the sides thereof are provided by elongate structural elements which lie within the periphery of the frame and the length directions of which are peripheral of the cells.

Owing to the invention, the tubular frame can be of greater strength than if comprised of a honeycomb structure consisting of rectangular cells. The present frame has superior axial, torsional and lateral stiffness, so as to make a more rigid structure whereby the factors that cause metal fatigue can be reduced.

It is possible to re-locate some of the loadings and look at the design criteria from a different aspect by introducing the present stronger, more rigid structure of a configuration better suited to perform its function and a better method of manufacture.

The present invention is applicable to airframes, bridge structures, pressure vessels, model aircraft, coffer dams, ship hulls, tubular reinforcing, packaging, columns and beams, axles and pre-fabricated buildings.

Figure 1:
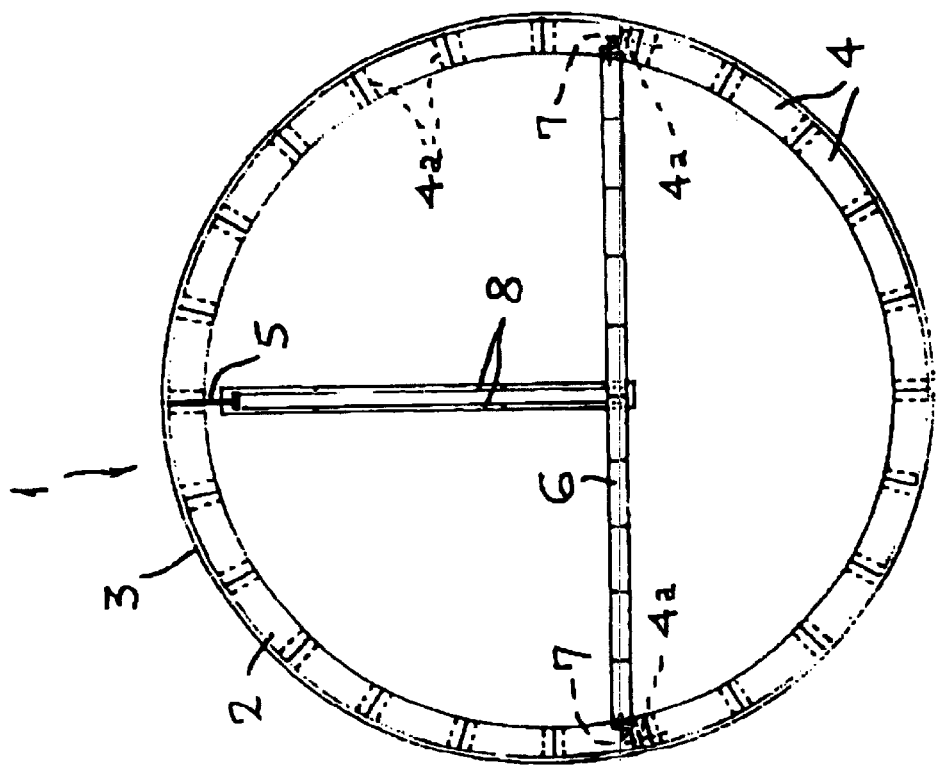
Figure 3:
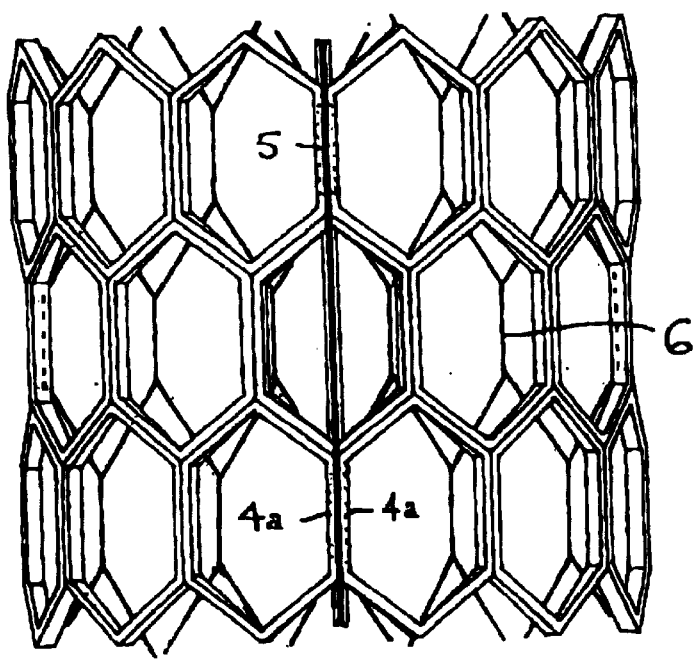
Figure 4:
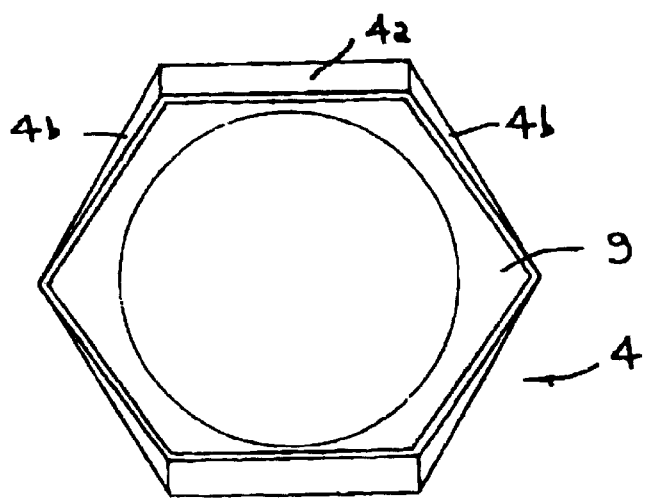
Figure 5:
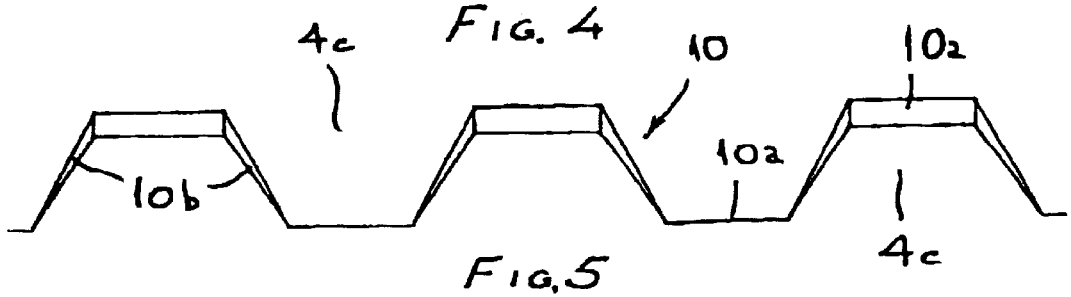
Figure 8:
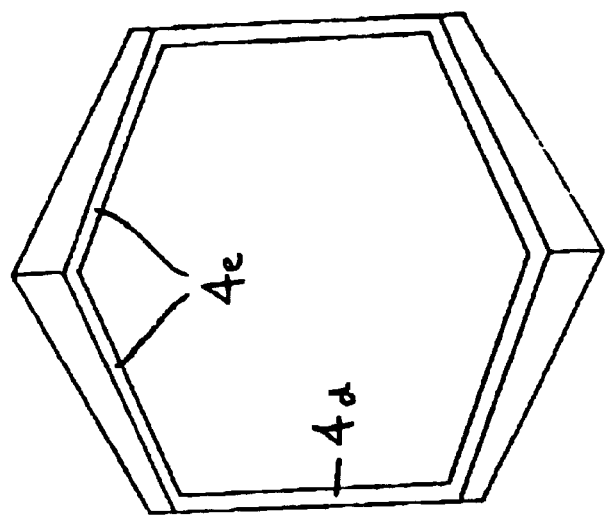
Figure 7:
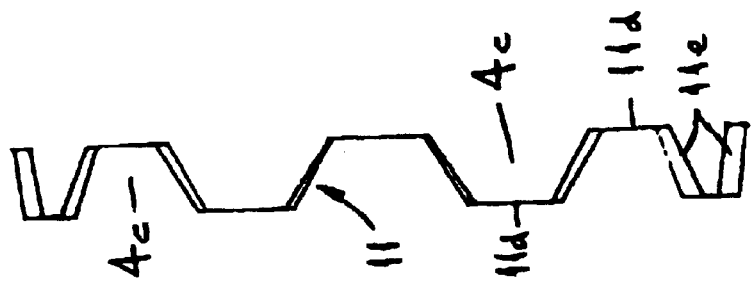
Figure 6:
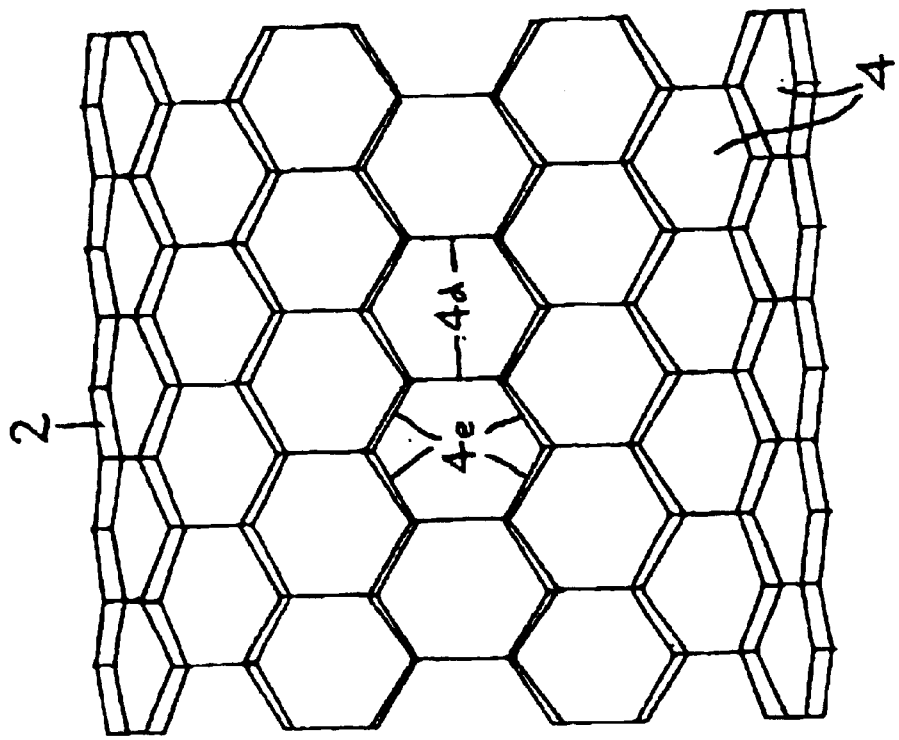
Figure 9:
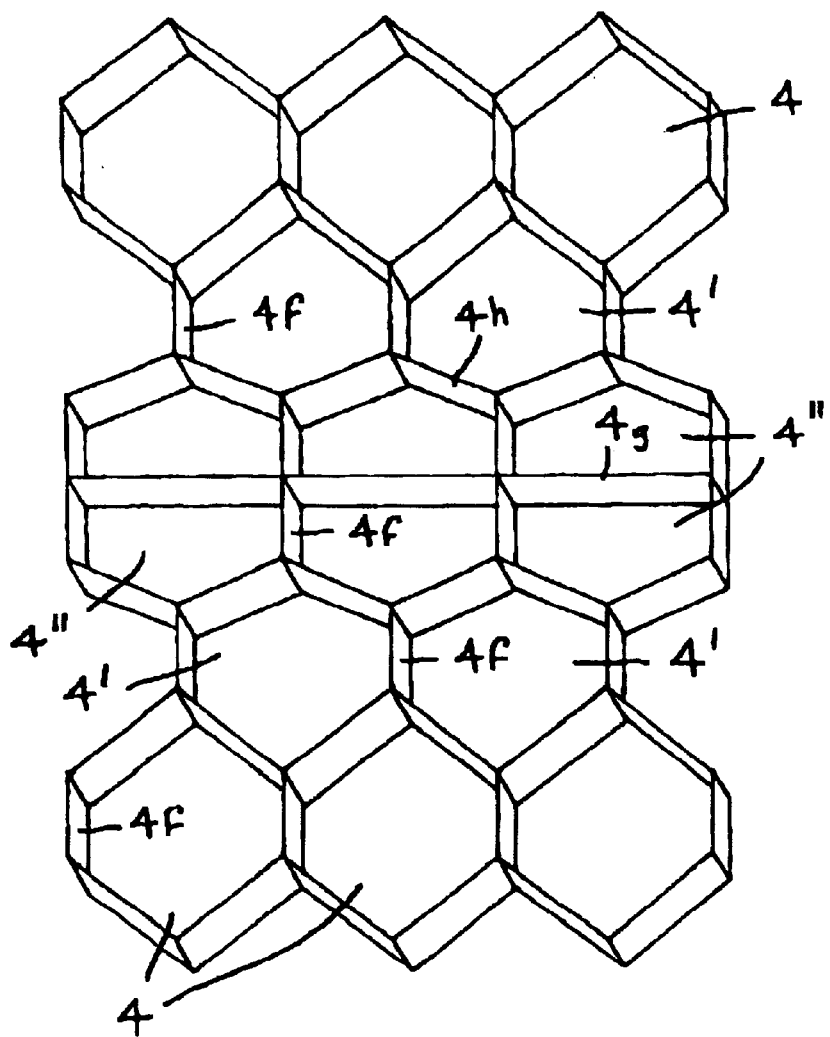
Figure 10:
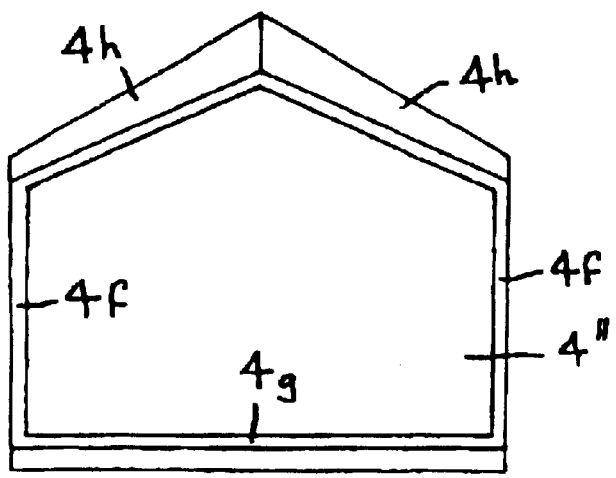

In order that the invention may be clearly understood and readily carried into effect, reference will now be made, by way of example, to the accompanying drawings, in which:

FIG. 1 is an end view of an aeroplane fuselage including a circular-cylindrical honeycomb structure, FIG. 2 is a fragmentary side view of the fuselage with skin removed, FIG. 3 is a fragmentary top plan view of the fuselage with skin removed, FIG. 4 is an inner end view of an alternative version of a cell of the fuselage, FIG. 5 is a side view of a straight, corrugated member of a plurality of identical members from which a honeycomb structure similar to that of FIG. 1 can be made, FIG. 6 is a view similar to FIG. 2, but of another version of the honeycomb structure, FIG. 7 is a side view of a curved, corrugated member of a plurality of identical members from which the honeycomb structure of FIG. 6 can be made, FIG. 8 is an inner end view of a cell of a plurality of identical cells from which the honeycomb structure of FIG. 6 can be made, FIG. 9 is a developed perspective view of a further version of the honeycomb structure, FIG. 10 is an inner end view of a cell of the honeycomb structure of FIG. 9, FIG. 11 is a developed plan view of a yet further version of the honeycomb structure, FIG. 12 is a fragmentary end view of a honeycomb structure of elongated cross-section, and FIG. 13 is a view similar to FIG. 7 of a curved, corrugated member for use in a honeycomb structure which tapers internally and externally.

Referring to FIGS. 1 to 3, an aeroplane fuselage 1 includes a circular-cylindrical tubular frame 2 externally covered by a skin 3. The frame 2 consists of a circular cylindrical honeycomb structure consisting of hexagonal cells 4 distributed round the periphery of the frame 2 and distributed along the frame 2. Opposite sides 4a of each of the cells 4 lie in axial planes of the frame 2. The four other sides 4b of each cell, namely those which extend obliquely about the periphery of the frame 2, have each surface thereof radial to the tubular frame 2 and so are helical. The honeycomb structure is assembled from a plurality of individual cells 4, all of which are arcuate as viewed longitudinally of the frame 2, attached face-to-face to each other. Each individual cell 4 may be made by suitable bending of a strip with its ends then welded together, or by casting. The cells 4 may be attached to each other by means of hollow and/or solid rivets and/or by a bonding material, for example glue. Extending along the top of the frame 2 is a reinforcing spine 5 which extends longitudinally of the frame 2 which is in the form of two metal strips attached to the sides 4a of some of the uppermost cells 4 and intersecting others of the uppermost cells 4. Extending horizontally across the interior of the frame 2 is a partition, in this case a platform 6. The platform 6 is also of honeycomb structure, as illustrated diagrammatically in FIG. 3, and is simply attached to sides 4a of cells 4 at an appropriate height by suitably angled brackets 7. The platform 6 is centrally suspended from the spine 5 by way of a double trellis 8. The spine 5 also absorbs some of the landing loads of the aeroplane and the other main loadings can be attached thereto. Each cell 4 shown in FIGS. 1 and 2 is fully open at both of its inner and outer ends. However, if required, one or both of the inner and outer ends of each cell 4 may be at least partially closed. A cell 4 having a partially closed outer end is illustrated in FIG. 4, where the outer end is partially closed by an end wall 9 having an inner periphery in the form of a circle which is arcuate as viewed longitudinally of the frame 2. In the event that the cells 4 are closed at their outer ends, the skin 3 may be dispensed with.

Although the platform 6 is shown supported from a single spine 5, it may be supported from a plurality of parallel spines spaced apart circumferentially of the frame 2 by at least one half-cell.

Instead of the honeycomb structure being assembled from individual cells 4 attached to each other, the frame 2 may be assembled from a plurality of corrugated members extending generally longitudinally of the frame 2 and each identical to the member 10 shown in FIG. 5. The member 10 may be made by suitable bending from straight strip or by casting. It includes straight sections 10a alternating with helical sections 10b. These define part-cells, i.e. half-cells 4c so that, when these identical members have their sections 10a attached together face-to-face, the cells 4 are provided.

Referring to FIGS. 6 and 7, in this version of the honeycomb structure, the hexagonal cells 4 each have two opposite sides 4d lying in radial planes of the tubular frame 2, these sides 4d having their radially inner and outer edges curvedly co-axial with the frame 2. The other four sides 4e of each cell 4 are helical. The honeycomb structure may be assembled from a plurality of curved, corrugated members 11 which may each be circular or semi-circular as viewed longitudinally of the frame 2 and may be made by bending of strip material or by casting. The member 11 consists of curved sections 11d lying in radial planes and alternating with helical sections 11e. The member 11 thus provides a plurality of half-cells 4c so that, when the corrugated members are interconnected by attaching the sections 11d face-to-face, the cells 4 are formed. Again, if desired, the honeycomb structure of FIG. 6 may be assembled by attaching together face-to-face a plurality of individual cells each as shown in FIG. 8 and having the sides 4d and 4e.

It is not necessary that the cells of the honeycomb structure, whether of the frame 2 or of the partition 6, should be identical to each other. They may have the same number of sides as each other but be different in shape, or they may have differing numbers of sides. A honeycomb structure having such mixed cell structure is shown in FIG. 9, where the hexagonal cells 4 interfit with hexagonal cells 4' of different shape, which interfit with pentagonal cells 4". It will be noted that the pentagonal cells 4" are of such form that each pair of those cells 4" is of hexagonal outline. The honeycomb structure shown in FIG. 9 may be used in the planar form shown, or in a tubular form in which the parallel sides 4f of the cells 4, 4' and 4" extend preferably either longitudinally of the tube or circumferentially of the tube. The honeycomb structure of FIG. 9 is particularly useful in circumstances when a spine is to be inserted between the face-to-face sides 4g of the cells 4". Again, the honeycomb structure of FIG. 9 can be made either by attaching corrugated members face-to-face, or by attaching individual cells face-to-face. FIG. 10 illustrates an individual cell 4" in which the sides 4f are to extend circumferentially of a tubular honeycomb structure, the straight side 4g is to extend longitudinally of the structure and the helical sides 4h are to extend obliquely.

The sides 4g may be oblique to the sides 4f, so that the row of sides 4g is of a zig-zag form rather than straight.

If desired, to give a good strength:weight ratio, the sides 4a, 4b, and 4d to 4h may have apertures therethrough.

FIG. 11 shows a honeycomb structure made solely of the somewhat pear-shaped hexagonal cells 4'.

It is sometimes desirable that the tubular frame should be of an elongated circular form in cross-section, i.e. with two semi-circular sections 2' joined by straight sections 2", as diagrammatically illustrated in FIG. 12, in which case some of the cells 4 would have planar inner and outer end surfaces, others would have curved inner and outer end surfaces, whilst yet others would each have inner and outer end surfaces each of which is half planar and half curved.

The tubular frame 2 may be such as to taper longitudinally. FIG. 13 illustrates one corrugated member 11' of a plurality of corrugated members which taper in series both internally and externally to provide a tubular frame 2 tapering both internally and externally. The member 11' has curved sections 11d lying in radial planes and alternating with spiral sections 11'e.

The tubular frame 2 may be of other shapes, for example oval or elliptical in cross-section.

To create an enclosure, the tubular frame 2 is closed at both ends by walls, for example geodetic walls.

The suspension arrangement shown in FIGS. 1 to 3 is particularly applicable to circumstances where an internal platform is required, for example in passenger aeroplanes or bridges.

The frames 2 described with reference to the drawings are particularly advantageous in the construction of main frames such as those of aircraft, bridges and pressure vessels, by being relatively more isotropic and better able to withstand the internal and external pressure fluctuations than, for example, a frame-and-stringer construction. In particular, in comparison with a rectangular cell structure, the hexagonal cell structure for the same weight is much stiffer in torsion and under vertical loading and its most highly stressed portions are significantly less highly stressed.

What is claimed is:

1. Apparatus including a round tubular honeycomb frame comprising a skeleton capable of carrying a both torsional and bending load and in the form of a structure with cells thereof distributed round a periphery of the frame and distributed along the frame, said cells being each of at least five-sided form, at least some of said cells being arcuate as viewed longitudinally of said frame and the sides of said cells being provided by elongate structural elements which lie within the periphery of the frame and respective opposite surfaces of which are continuously radial and length directions of which are peripheral of the cells, and a load member carried by said structure and transmitting a load onto said structure.

2. Apparatus according to claim 1, wherein opposite sides of each of said cells lie in axial planes of said frame.

3. Apparatus according to claim 1, wherein opposite sides of each of said cells lie in radial planes of said frame.

4. Apparatus according to claim 1, wherein said structure is made from a plurality of corrugated members each providing a plurality of part-cells and attached face-to-face to each other.

5. Apparatus according to claim 1, wherein said structure is made from a plurality of cells attached face-to-face to each other.

6. Apparatus according to claim 5, wherein at least some of said cells each have an at least partially closed end.

7. Apparatus according to claim 6, wherein each at least partially closed end is the outer end of its cell.

8. Apparatus according to claim 1, and continuously curved peripherally, said cells being correspondingly curved.

9. Apparatus according to claim 1, and having its periphery of a form with opposite curved sections joined by opposite straight sections, the cells in said curved sections being correspondingly curved and the cells in said straight sections being straight.

10. Apparatus according to claim 1 and of a tapering form at its inside and its outside.

11. Apparatus according to claim 1 and having a partition attached directly to said cells extending longitudinally through the volume encircled by said structure.

12. Apparatus according to claim 1, wherein said frame constitutes the main load-carrying frame of an aeroplane fuselage.

13. Apparatus according to claim 1, wherein said frame constitutes the main load-carrying frame of a bridge.

14. Apparatus according to claim 1, wherein said honeycomb structure is in the form of an uninterrupted loop of honeycomb extending round substantially the whole of the circumference of said frame.

15. Apparatus according to claim 1, wherein, as viewed longitudinally of said frame, said frame has a continuous outer periphery.

16. Apparatus according to claim 1, wherein said frame has a skin which is subjected to a differential pressure between its inner and outer surfaces which pressure produces a lateral force distributed at least partially around said frame.

17. Apparatus according to claim 1 and having an enclosure contiguous with and fixed relative to said frame, said enclosure being subjected to pressure fluctuations.

18. Apparatus according to claim 1 in which said load member has two ends each of which is attached directly to at least one of said cells.

19. Apparatus according to claim 1, wherein said frame includes a plurality of reinforcing spines extending longitudinally of said frame and in said structure.

20. Apparatus including a tubular frame comprising a load-carrying skeleton in the form of a honeycomb structure with cells thereof distributed round periphery of the frame and distributed along the frame, said cells being each of at least five-sided form and the sides thereof being provided by elongate structural elements which lie within the periphery of the frame and length directions of which are peripheral of the cells, and a load carried by said structure, wherein at least some of said cells are pentagonal of such form that each pair of those pentagonal cells is of hexagonal outline.

21. Apparatus including a tubular frame comprising a load-carrying skeleton in the form of a honeycomb structure with cells thereof distributed round a periphery of the frame and distributed along the frame, said cells being each of at least five-sided form and the sides thereof being provided by elongate structural elements which lie within the periphery of the frame and length directions of which are peripheral of the cells, and a load carried by said structure, said frame including a reinforcing spine extending longitudinally of said frame and in said structure.

22. Apparatus including a tubular frame comprising a load-carrying skeleton in the form of a honeycomb structure with cells thereof distributed round a periphery of the frame and distributed along the frame, said cells being each of at least five-sided form and the sides thereof being provided by elongate structural elements which lie within the periphery of the frame and length directions of which are peripheral of the cells, and a load carried by said structure, said frame having a partition extending longitudinally through the volume encircled by said structure, and including a reinforcing spine extending longitudinally of said frame and in said structure, and having suspension elements suspending said partition from said spine.

* * * * *